Figure 1:
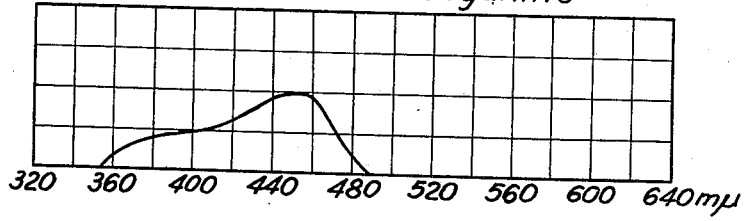

Sept. 3, 1940.   B. BEILENSON   2,213,730
BENZOTHIAZINOMEROCYANINE DYES
Filed April 23, 1938

3-ethylrhodaninylidinyl-4'-methyl-
2',4'-benzothiazinomerocyanine 4-keto-2-thion-3-ethyloxazolidinyl-4'-methyl-
2',4'-benzothiazinomerocyanine.

Bernard Beilenson
INVENTOR
BY N. M. Perrins
Daniel J. Mayne
ATTORNEYS

Patented Sept. 3, 1940

2,213,730

UNITED STATES PATENT OFFICE 2,213,730

BENZOTHIAZINOMEROCYANINE DYES

Bernard Beilenson, Harrow, England, assignor to Eastman Kodak Company, Rochester, N. Y., a corporation of New Jersey Application April 23, 1938, Serial No. 203,907
In Great Britain April 26, 1937

6 Claims. (Cl. 260—240)

This invention relates to dyes and more particularly to dyes containing a six-membered ring containing both nitrogen and sulfur, to a process for the preparation thereof and to photographic emulsions sensitized therewith.

In my copending application Serial No. 138,158, filed April 21, 1937, I have described the preparation of thiazinopseudocyanine and thiazinoisocyanine dyes by condensation of cyclammonium quaternary salts containing a reactive alkyl group in the alpha or gamma position with a quaternary salt of a 3-alkylthiol-2,4-benzthiazine or a 3-alkylthiol-1,4-benzthiazine. I have now found that a new kind of dye can be prepared by condensing quaternary salts of 3-alkylthiol-2,4-benzothiazines or 3-alkylthiol-1,4-benzothiazines with organic compounds containing a reactive methylene ($\equiv$C—CH$_2$—C$\equiv$) group, particularly a nuclear reactive methylene group adjacent to a nuclear >C=O group (which may be called an oxocarbonyl group, but is ordinarily referred to merely as "a carbonyl group") or a nuclear >C=S group (thiocarbonyl group). My new dyes, particularly those derived from five-membered heterocyclic organic compounds containing a nuclear nitrogen atom and a nuclear sulfur atom as well as a nuclear reactive methylene group adjacent to a nuclear carbonyl group, are useful in the preparation of optically sensitized emulsions. In addition, my new dyes can be employed in the manufacture of light filters and in the coloring of cellulose acetate yarn.

It is accordingly, an object of my invention to provide new dyes. A further object is to provide a process for the preparation thereof. A further object is to provide photographic emulsions sensitized with my new dyes. Other and more specific objects will appear hereinafter.

A preferred group of my new dyes can be represented by the following general formula:

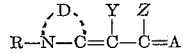

wherein A represents a divalent atom, such as oxygen or sulfur, D represents the non-metallic atoms necessary to complete a 1,4-benzothiazine nucleus or a 2,4-benzothiazine nucleus either of which nuclei can have simple substituents attached to the benzene nucleus, R represents an alkyl group or alcohol radical, such as methyl, ethyl, n-propyl, isoamyl, allyl, benzyl, $\beta$-ethoxyethyl, $\beta$-carbethoxyethyl or decyl for example, Y represents an organic radical or group, Z represents an organic radical or group and Y and Z jointly or together represent the non-metallic atoms necessary to complete a cyclic carbonyl-containing organic nucleus. More particularly, Y represents a cyano (CN) group, particularly when Z represents an aryl group, such as a phenyl group or a naphthyl group for example, or when Z represents an arylamino group, such as phenylamino or naphthylamino for example, or when Z represents an alkylamino group, such as methylamino for example, or Y represents an acyl group, such as acetyl or benzoyl for example, particularly when Z represents an alkyl group or an aryl group, such as phenyl for example.

More specifically, Y and Z jointly represent the non-metallic atoms necessary to complete a five-membered heterocyclic nucleus, such as a rhodanine nucleus for example an unsubstituted rhodanine nucleus, a 3-alkylrhodanine nucleus, a 3-phenylrhodanine nucleus or a 3-naphthylrhodanine nucleus, a thiorhodanine nucleus, a 2,4-diketothiazolidine nucleus, a 4-keto-2-thion-oxazolidine nucleus or its 3-alkyl derivatives, a hydantoin nucleus or its 3-alkyl, 3-phenyl or 3-naphthyl derivatives as well as its 1,3-dialkyl or 1,3-diphenyl derivatives, a 2-thiohydantoin nucleus or its derivatives, a 4-thiohydantoin nucleus or its derivatives, a thionaphthenone nucleus, such as a 2(1)-thionaphthenone nucleus or a 1(2)-thionaphthenone nucleus or a pyrazolone nucleus, such as 1-phenyl-3-methyl-5-thiopyrazolone nucleus, for example.

Y and Z jointly or together also represent the non-metallic atoms necessary to complete a six-membered heterocyclic nucleus, such as a 2,4,6-triketohexahydropyrimidine nucleus, for example barbituric acid or 2-thiobarbituric acid, as well as their 1-alkyl or 1,3-dialkyl derivatives; a 3,4-dihydro-2(1)-quinolone nucleus, such as 3,4-dihydro-2(1)-quinolone (dihydrocarbostyril); a 3,4-dihydro-2(1)-quinoxalone nucleus, such as 3,4-dihydro-2(1)-quinoxalone (oxydihydroquinoxaline); 3-phenomorpholone (1,4,2-benzoxazine-3(4)-one or benzo-$\beta$-morpholone) nuclei; 1,4,2-benzothiazine-3(4)-one (ketodihydrobenzoparathiazine) nuclei and the like six-membered heterocyclic nuclei.

In preparing my new dyes according to my invention, I condense an organic compound containing a reactive methylene group with quaternary salts of 3-alkylthiol-1,4-benzothiazines or 3-alkylthiol-2,4-benzothiazines in the presence of a basic condensing agent. Heat accelerates the formation of my new dyes. As basic condensing agents sodium or potassium hydroxides, sodium or potassium carbonates, sodium ethylate, sodium or potassium acetates, or organic bases can be employed for example. As organic base condensing agents, pyridine or strong organic bases, i. e. organic bases whose aqueous solution have dissociation constants substantially greater than that of an aqueous solution of pyridine, can be employed. Alkali metal carbonates or strong organic bases are advantageously employed, I have found. Diluents can be employed in the reaction mixture if desired. As diluents, I have found that lower aliphatic alcohols of the formula $C_nH_{2n+1}OH$, wherein $n$ represents 1, 2, 3 or 4, are advantageously employed. The 3-alkylthiol-1,4-benzothiazine and 3-alkylthiol-2,4-benzothiazine quaternary salts are advantageously employed as the alkiodides, alkyl sulfates or alkyltoluenesulfonates, although other quaternary salts, such as the perchlorate, for example, can be employed The following compounds are representative of the organic compounds containing a reactive methylene group which can be condensed according to my process with 3-alkylthiol-1,4-benzothiazine or 3-alkylthiol-2,4-benzothiazine quaternary salts; benzoylacetonitrile, naphthoylacetonitrile, cyanoacetanilide, N-methylcyanoacetamide, N-naphthylcyanoacetamide, acetylacetone, benzoylacetone, rhodanine, 3-alkylrhodanines, 3-phenylrhodanines, 2,4-diketothiazolidine, 4-keto-2-thion-3-alkyloxazolidines, hydantoin, 1-alkyl-3-phenylhydantoins, 1,3-diphenylhydantoin, 2-thiohydantoin, 1-alkyl-3-phenyl-2-thiohydantoins, 1,3-diphenyl-2-thiohydantoins, 4-thiohydantoin, 1-methyl-3-phenyl-5-thiopyrazolone, barbituric acid, thiobarbituric acid, dihydrocarbostyril and ketodihydrobenzoparathiazine.

While the process for preparing my new dyes is subject to variation, particularly as respects the nature and quantity of the organic compound containing a reactive methylene group which is employed, the nature and quantity of the benzothiazine quaternary salt employed, the nature and quantity of the basic condensing agent employed, the nature and quantity of diluent employed, if any, the time of reaction employed, the temperatures employed and the method of isolation and purification of the dyes employed, the following examples will serve to illustrate the manner of practicing my invention. These examples are not intended to limit my invention.

EXAMPLE 1.—*3-ethylrhodaninylidinyl-4'-methyl-2',4'-benzothiazinomerocyanine*

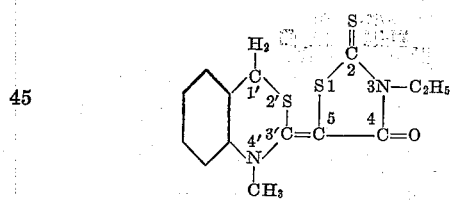

1.69 g. (1 mol.) of 3-methylthiol-2,4-benzothiazine methiodide, 0.81 g. (1 mol.) of 3-ethylrhodanine and 0.35 g. (0.5 mol.) of anhydrous potassium carbonate were heated at 100° C. with 12 cc. of absolute ethyl alcohol for about five minutes. A yellow dye separated and this was filtered off, washed first with water and then with ethyl alcohol. It was then recrystallized from methyl alcohol. The dye was obtained as yellow crystals, melting at 190° C., which gave a strongly yellow methyl alcoholic solution.

EXAMPLE 2.—*4-keto-2-thion-3-ethyloxazolidinyl-4'-methyl-2',4'-benzothiazinomerocyanine*

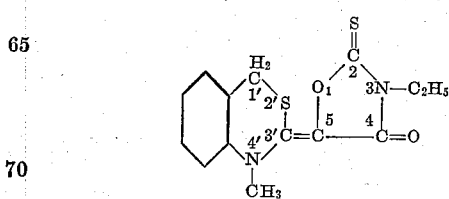

3-ethylthiol-2:4-benzothiazine methiodide (2.34 g., 1 mol.), 4-keto-2-thion-3-ethyloxazolidine (0.97 g., 1 mol.) anhydrous potassium carbonate (0.92 g., 1 mol.) and absolute alcohol (15 c. c.) were heated under reflux at 100° C. for 25 minutes. The reaction mixture was cooled and the yellow dye filtered off, washed with water, dried and recrystallized from methyl alcohol. The dye was obtained as fine yellow needles melting at 169–170° C.

EXAMPLE 3.—*4-methyl-3-2,4-benzothiazinylidenecyanoacetanilide*

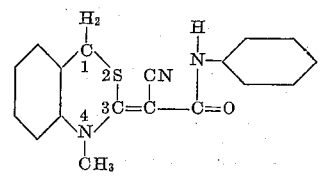

3-ethylthiol-2:4-benzothiazine methiodide (2.34 g., 1 mol.) cyanoacetanilide (1.07 g., 1 mol.) anhydrous potassium carbonate (0.92 g., 1 mol.) and absolute alcohol, (12 c. c.) were stirred and heated at 100° C. for 10 minutes. The white solid was filtered off, washed with water, dried and recrystallized from methyl alcohol, being obtained as pure white crystals melting at 204° C.

EXAMPLE 4.—*3-(benzoyl-cyano-methylene)-4-methyl-3,4-dihydro-2,4-benzothiazine*

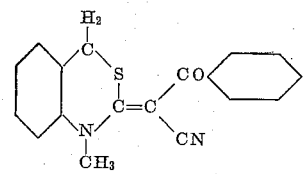

3-methylthiol-2:4-benzothiazine methiodide (3.37 g., 1 mol.) benzoylacetonitrile (1.45 g., 1 mol.) anhydrous potassium carbonate (1.38 g., 1 mol.) and absolute alcohol (20 c. c.) were heated at 100° C. for 25 minutes and the cooled product filtered, the white solid being washed with water, dried and recrystallized from methylated spirit. It was obtained as small white needles M. P. 180–181° C.

EXAMPLE 5.—*3-(3-ethyl-2,4-dithiono-5-thiazolidylidene)-4-methyl-3,4-dihydro-2,4-benzothiazine*

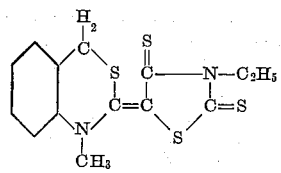

3-methylthiol-2:4-benzothiazine (1.95 g., 1 mol.) was fused with methyl-p-toluenesulphonate (1.86 g., 1 mol.) at 150° for two hours, the mass dissolved in absolute alcohol (15 c. c.) and to this solution was added 3-ethylthiorhodanine (1.76 g., 1 mol.) and then triethylamine (1.38 c. c., 1 mol.). The mixture was heated and stirred at 100° for five minutes, the dye filtered off, washed with water and recrystallized from pyridine. The new dye was obtained in the form of brick-red platelets, giving an orange solution in alcohol. It melted at 199°.

3-ethylthiorhodanine was prepared by the action of phosphorus pentasulphide on 3-ethylrhodanine in benzene solution. It distilled at 159–160°/23 mm. pressure.

The methods of preparation of 3-alkylthiol-1,4-benzothiazines and 3-alkylthiol-2,4-benzothiazines and their quaternary salts are described in my copending application Serial No. 138,158, filed April 21, 1937.

The benzothiazine nuclei are numbered throughout this application in accordance with the system prescribed in Richter's Lexikon.

My new dyes sensitize photographic emulsions in a novel manner. My invention is particularly directed to the ordinarily employed gelatino-silver-halide emulsions and especially to gelatino-silver-chloride emulsions. However, my new dyes can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light sensitive. By way of illustration, the herein described emulsions were prepared employing an ordinary gelatino-silver-chloride emulsion of ordinary concentration.

The methods of incorporating dyes in emulsions are simple and well known to those skilled in the art. In practicing my invention, my new dyes are advantageously added to the emulsion in the form of their solutions in appropriate solvents. The solvent must, of course, be compatible with the emulsion, substantially free from any deleterious effect on the light-sensitive materials and capable of dissolving the dyes. Methanol has proven satisfactory as a solvent for the dyes in practicing my invention. The dyes are advantageously incorporated, in the finished, washed emulsion and should be uniformly distributed throughout the emulsion. The concentration of the dye in the emulsion can be varied widely, for example, from about 5 to 100 mg. of the dyes in about 1000 cc. of flowable emulsion. The suitable and most economical concentration for any given emulsion will be apparent to those skilled in the art upon making the ordinary tests and observations customarily employed in the art of emulsion making. The concentration will, of course, vary according to the light-sensitive salt employed and according to the magnitude of sensitizing effect desired.

To prepare a gelatino-silver-halide emulsion, the following procedure is satisfactory:

A quantity of the dye is dissolved in methyl alcohol, acetone or pyridine and a volume of this solution (which may be diluted with water) containing from 5 to 100 mg. of dye is slowly added to about 1000 cc. of a gelatino-silver-halide emulsion, with stirring. Stirring is continued until the dye is uniformly dispersed. With the more powerful of my new sensitizing dyes, 10 to 20 mg. of dye per 1000 cc. of emulsion suffice to produce the maximum sensitizing effects with the ordinary gelatino-silver-halide emulsions.

The above statements are only illustrative and are not to be understood as limiting my invention in any sense, as it will be apparent that these dyes can be incorporated by other methods in most of the photographic emulsions customarily employed in the art, such, for example, as by bathing a plate or film upon which the emulsion has been coated in a solution of the dye in an appropriate solvent, although such a method is not to be preferred. The claims are intended to cover any combination of these new dyes with a photographic emulsion whereby the dye exerts a sensitizing effect on the emulsion as well as a photographic element, such as a support of glass, cellulose acetate, cellulose nitrate, other cellulose derivative or resin, upon which the emulsion containing the dye is coated.

Figure 2:
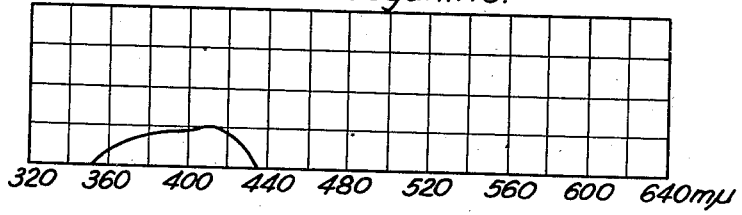

The accompanying drawing is by way of illustration and depicts the sensitizing effect of two of my new dyes. Each figure of the drawing is a diagrammatic reproduction of a spectrogram showing the sensitivity of an emulsion containing one of my new dyes. More specifically, in Fig. 1, the curve represents the sensitivity of an ordinary gelatino-silver-chloride emulsion containing 4-keto-2-thione-3-ethyloxazolidinyl-4'-methyl-2',4'-benzothiazinomerocyanine. In Fig. 2, the curve represents the sensitivity of an ordinary gelatino-silver-chloride emulsion containing 3-ethylrhodaninylidinyl-4'-methyl-2',4'-benzothiazinomerocyanine.

Still further examples showing the application of my invention could be cited, but the foregoing will be sufficient to teach those skilled in the art the manner of practicing my invention.

What I claim as my invention and desire to be secured by Letters Patent of the United States is:

1. A dye of the following formula:

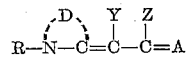

wherein A represents a carbonyl group, D represents the non-metallic atoms necessary to complete a nucleus selected from the group consisting of 1,4-benzothiazine and 2,4-benzothiazine nuclei, R represents an alkyl group, Y and Z represent organic radicals and Y and Z together represent the non-metallic atoms necessary to complete a carbonyl-containing cyclic organic nucleus.

2. A dye of the following formula:

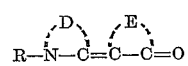

wherein D represents the non-metallic atoms necessary to complete a nucleus selected from the group consisting of 1,4-benzothiazine and 2,4-benzothiazine nuclei and E represents the non-metallic atoms necessary to complete a five-membered heterocyclic organic nucleus containing a nuclear nitrogen and a nuclear sulfur atom.

3. A dye of the following formula:

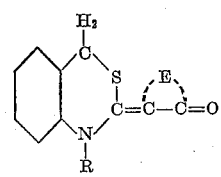

wherein E represents the non-metallic atoms necessary to complete a rhodanine nucleus and R represents an alkyl group.

4. A dye of the following formula:

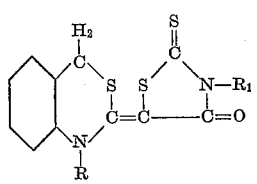

wherein R and R' represent alkyl groups.

5. A process for preparing a dye comprising condensing, in the presence of a basic condensing agent, a quaternary salt selected from the group consisting of 3-alkylthiol-1,4-benzothiazine quaternary salts and 3-alkylthiol-2,4-benzothiazine quaternary salts with an organic compound containing a reactive methylene group.

6. A process for preparing a dye comprising condensing, in the presence of a strong organic base condensing agent, a quaternary salt selected from the group consisting of 3-alkylthiol-1,4-benzothiazine quaternary salts and 3-alkylthiol-2,4-benzothiazine quaternary salts with an organic compound containing a reactive methylene group.

BERNARD BEILENSON.